Oct. 6, 1925.

G. H. GIBSON

WATER DEAERATION

Filed Nov. 21, 1922

1,556,098

INVENTOR
GEORGE H. GIBSON
BY John E. Hubbell
his ATTORNEY

Patented Oct. 6, 1925.

1,556,098

UNITED STATES PATENT OFFICE.

GEORGE H. GIBSON, OF MONTCLAIR, NEW JERSEY, ASSIGNOR TO COCHRANE CORPORATION, OF PHILADELPHIA, PENNSYLVANIA, A CORPORATION OF PENNSYLVANIA.

WATER DEAERATION.

Application filed November 21, 1922. Serial No. 602,463.

To all whom it may concern:

Be it known that I, GEORGE H. GIBSON, a citizen of the United States, and resident of Montclair, in the county of Essex and State of New Jersey, have invented certain new and useful Improvements in Water Deaeration, of which the following is a specification.

The general object of my present invention is to provide an improved method of, and apparatus for deaerating water. My invention is characterized by the effective use of a relatively small amount of heat in deaerating water, and the delivery of the deaerated water at a temperature much below 212° F., and by the fact that all, or a considerable portion of the heat imparted to the water, may be supplied by exhaust steam at a pressure appreciably below that of the atmosphere. My invention was especially devised for use in supplying deaerated boiler feed water to economizers at a temperature substantially below 212° F.

The various features of novelty which characterize my invention are pointed out with particularity in the claims annexed to and forming a part of this specification. For a better understanding of my invention, however, and of its advantages and specific objects attained with its use, reference should be had to the accompanying drawings and descriptive matter in which I have illustrated and described preferred embodiments of my invention.

Figure 1:
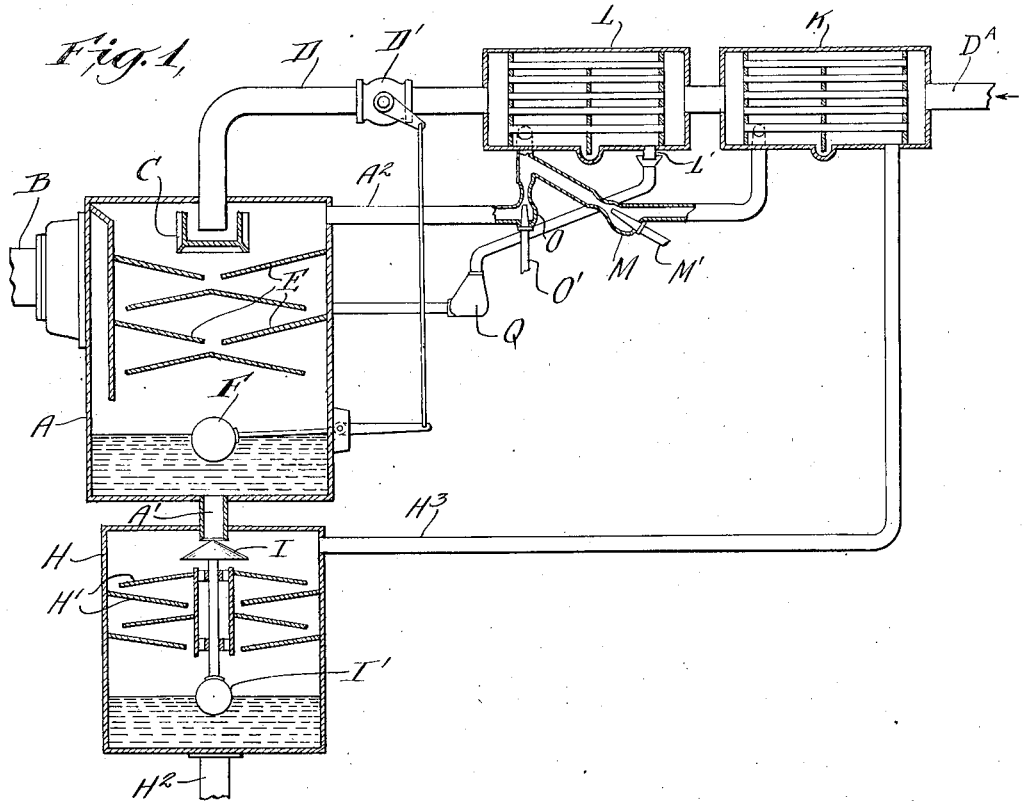
Figure 2:
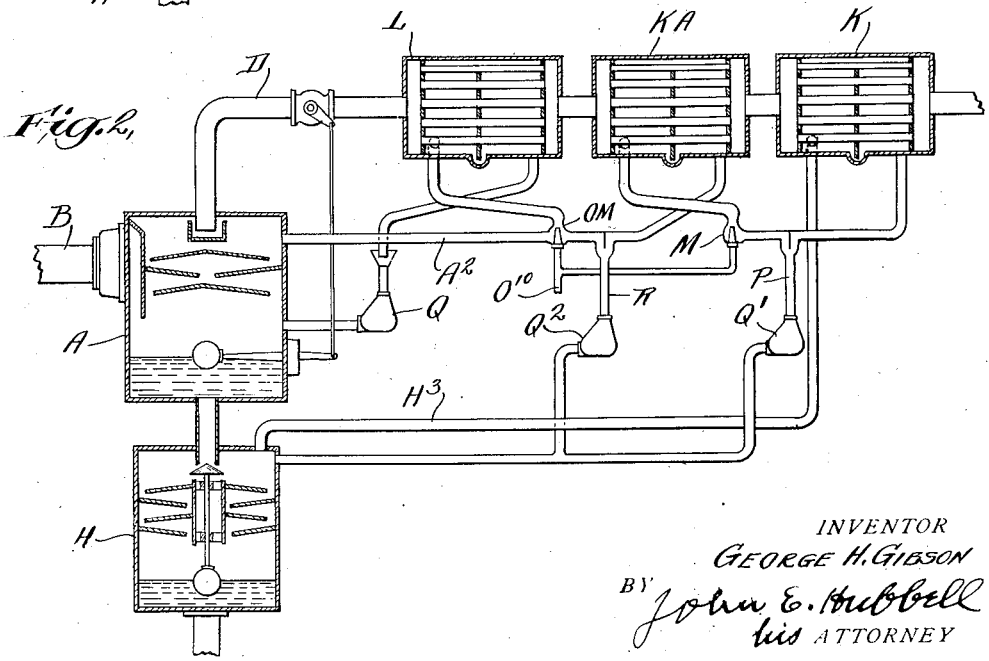

Of the drawings:

Fig. 1 is a diagrammatic elevation of one form of apparatus constructed in accordance with the invention; and Fig. 2 is a diagrammatic elevation of a slightly modified form of the apparatus.

In the drawings, and referring first to the construction shown in Fig. 1, A represents a heating and deaerating chamber which may be similar in its general construction and arrangement to an ordinary open feed water heater. Steam is supplied to the heater A through a pipe B, while the water to be treated is passed into an overflow trough C located in the upper portion of the chamber A, through a supply pipe D. The water overflows from the trough C on to splash trays or baffles E over which the water flows in film-like and broken streams into a reservoir space in the bottom of the chamber A. An approximately constant volume of water in the reservoir space in the chamber A is maintained by means of a float F and connections through which the float opens and closes the valve D' in the water supply pipe D in response to decreases and increases in the height of water level in the tank A.

The tank A is provided with a bottom outlet A', opening into the upper end of an expansion chamber H. The latter is provided with a set of inclined trays or baffles H', for causing the water entering the chamber to pass in film-like or broken streams into the reservoir space in the bottom of the chamber. An approximately constant body of water is maintained in the bottom of the chamber H by means of a float I' responsive to the height of liquid level in the chamber H and actuating a valve I which controls the water flow into the chamber H through the outlet A' from the chamber A.

The raw water treated passes from a supply pipe DA, first through the tubes of a surface condenser and air cooler K, and thence into the pipe D and chamber A through the tubes of a heater and vapor condenser L, generally similar in construction to the condenser K. The expansion chamber H is provided with an air outlet opening above the trays or baffles H' which is connected by a conduit $H^3$ to one end of the intertube space of the condenser K. The other end of the intertube space of the condenser K is connected to the suction inlet of a steam jet ejector M having a supply connection M'. The ejector M discharges into one end of the intertube space of the heater L. Into the same end of the intertube space of the heater L, a second steam jet ejector O discharges. The ejector O has a live steam supply connection O', and has its suction inlet connected by a pipe $A^2$ to an air outlet from the chamber A, which opens from the latter at a level above the trays E. As shown the ejectors M and O have a common discharge connection into the heater L. The heater L is provided with an air outlet L' through which air, and vapor entering the intertube space of the cooler and not condensed therein, may escape to the atmosphere. As shown water of condensation may escape from the intertube space of the air cooler through the outlet L', and may be returned to the chamber A through a trap Q which will pass water but not air into the chamber A.

In the contemplated mode of operation of the apparatus shown in Fig. 1, steam is supplied to the chamber A through the supply pipe B under such conditions as to maintain a suitable steam pressure and temperature in the chamber A, and in practice I contemplate the maintenance of a pressure in the chamber A appreciably below that of the atmosphere and corresponding to a steam temperature of 100° F. to 160° F. As the water passes down through the chamber A from the overflow trough C into the body of water in the body of the chamber, it is heated, and the major portion of the air contained in the water is liberated. The air and admixed vapor sucked out of the chamber A by the ejector O, is discharged into the intertube space of the heater L in which the major portion of the vapor is condensed, with a consequent transfer of its heat of vaporization to the water passing through the tubes of the cooler.

The apparatus shown in Fig. 1 is so adjusted and operated as to maintain a pressure and temperature in the expansion chamber H appreciably lower than the temperature and pressure, respectively, in the chamber A. When water passes from the chamber A to the outlet A' into the chamber H, the reduction in pressure to which the water is subjected results in the instantaneous conversion of a portion of the water into vapor. The conditions under which this vaporization occurs and the unvaporized water passes to the reservoir space in the bottom of the chamber H, are such as to separate from the unvaporized water, all but minute traces of the small amount of air carried by the water entering the chamber H. The air liberated in the chamber H and the vapor formed therein passes through the pipe H³ to the intertube space of the condenser K, in which practically all of the vapor is condensed, and in which the air is cooled, and from which the air and any uncondensed vapor mixed with it is withdrawn by the ejector M.

With the construction shown, water of condensation formed in the condenser K may drain back into the chamber H through the pipe H³. The vacuum or minus pressures maintained in the chamber A are determined by the relative amounts and temperatures of the steam and water admitted thereto, while the vacuum in H is determined by the action of the condenser K. The fact that the cold raw water passes first through the condenser K and then through the air cooler L, facilitates the maintenance of a higher vacuum in the chamber H, than in the chamber A.

With the apparatus shown in Fig. 1, used in the manner described, it is possible to very efficiently deaerate the water, and to deliver the water at a desirably low temperature for supply to economizers. It is an old idea in the art of deaerating water, to heat the water to a temperature of, or above 212° F., and then to reduce the temperature and pressure of the water in an expansion chamber with a resultant conversion of a portion of water into vapor; but I believe I am the first to provide a practical method of, and apparatus for deaerating water in this manner, in which the initial water temperature required may be appreciably below 212° F. This is desirable where a low water delivery temperature is wanted, and is advantageous in that by thus deaerating the water in two stages, so to speak, the bulk of the air contained in the raw water is eliminated in the chamber A, with a consequent reduction in the work put on the condenser K and ejector M, which handle the more attenuated air and vapor. The maintenance of a minus pressure in the chamber A, not only facilitates the liberation in the chamber of air passing through the chamber and economizes heat where a low final water temperature is wanted, but also serves as a low pressure condenser for the steam supplied to it through the pipe B. This is an advantage in many plants where the most available source of heat for heating and deaerating boiler feed water is the exhaust steam from an auxiliary or house turbine which is advantageously operated with an exhaust pressure lower than that of the atmosphere, even though the steam passing through the auxiliary is relatively small in amount.

The modified form of apparatus illustrated in Fig. 2 differs essentially from that shown in Fig. 1 in that the air and vapor mixture leaving the expansion chamber H through the pipe H³ is subjected to a two stage, air cooling and vapor condensing action, and in that the vacuum or minus pressure maintained in the expansion chamber H is effected by a two stage ejector.

In Fig. 2 the pipe H³ leads from the expansion chamber H to the intertube space of a condenser K, and air and uncondensed vapor is withdrawn from that space by an ejector M as in Fig. 1. The ejector M does not discharge directly into the air cooler L into which air is passed from the primary deaeration chamber A, but into an intermediate air cooler KA. The latter as shown, is similar in construction to the condenser K, and the raw water passing from the tubes of the condenser K to the tubes of the air cooler L flows through the tubes of the intermediate cooler KA. From the intermediate cooler KA, the air is passed into the cooler L, which also receives the air and vapor withdrawn from the chamber A. In the particular arrangement shown in Fig. 2, a single jet ejector OM has its suction chamber connected both to the chamber A, and to the intertube space of the intermediate cooler KA, and thus serves to maintain the proper vacuum in the chamber A and in the intertube space of the cooler and condenser KA. Water of condensation formed in the condenser K and intermediate cooler KA is returned through traps Q' and Q² respectively, to the expansion chamber H.

With the form of apparatus shown in Fig. 2, sufficient heat may be added to the water to effectually deaerate the latter by the small amount of steam supplied by the piping O¹⁰ for the operation of the ejectors M and OM, so that the steam supply pipe B to the deaeration chamber A may be dispensed with in some cases. It will be obvious, of course, that with the form of apparatus shown in Fig. 2 as with that shown in Fig. 1 the various steam jet ejectors may be replaced by mechanical air pumps, and of course when this is done with the apparatus shown in Fig. 2 effective deaeration requires the addition of heat, which is preferably furnished by steam passed into the chamber A through the pipe B.

While in accordance with the provisions of the statutes I have illustrated and described the best form of my invention now known to me, it will be apparent to those skilled in the art that changes may be made in the form of my invention without departing from its spirit as set forth in the appended claims, and that certain features of my invention may sometimes be used to advantage without a corresponding use of other features.

Having now described my invention, what I claim as new and desire to secure by Letters Patent, is:

1. The method of deaerating water which consists in passing the water through a closed chamber containing a vapor space, withdrawing air and vapor from said chamber to maintain a vapor pressure in the chamber lower than the pressure of the atmosphere, passing the water from the first chamber through a second closed chamber containing a vapor space, and withdrawing air and vapor from said second chamber to maintain a vapor pressure therein lower than the vapor pressure in the first mentioned chamber.

2. The method of deaerating water which consists in passing the water through a closed chamber containing a vapor space, withdrawing air and vapor from said chamber to maintain a pressure in the chamber lower than the pressure of the atmosphere, passing the water from the first chamber through a second closed chamber containing a vapor space, withdrawing air and vapor from said second chamber to maintain a vapor pressure therein lower than the vapor pressure in the first mentioned chamber, and condensing the vapor withdrawn from said second chamber and cooling the air admixed with the vapor by transferring heat therefrom to the water passing to the first chamber.

3. The method of deaerating water which consists in passing the water through a closed chamber containing a vapor space, withdrawing air and vapor from said chamber to maintain a vapor pressure in the chamber lower than the pressure of the atmosphere, passing the water from the first chamber through a second closed chamber containing a vapor space, withdrawing air and vapor from said second chamber to maintain a vapor pressure therein lower than the vapor pressure in the first mentioned chamber, and condensing the vapor withdrawn from said chambers and cooling the air admixed with the vapor by transferring heat therefrom to the water passing to the first chamber.

4. The method of deaerating water which consists in passing the water through a closed chamber containing a vapor space, withdrawing air and vapor from said chamber to maintain a vapor pressure in the chamber lower than the pressure of the atmosphere, passing steam at a pressure lower than the pressure of the atmosphere, into said chamber, passing the water from the first chamber through a second, closed chamber containing a vapor space, and withdrawing air and vapor from said second chamber to maintain a pressure therein lower than the pressure in the first mentioned chamber.

5. The method of deaerating water which consists in passing the water through a closed chamber containing a vapor space, withdrawing air and vapor from said chamber to maintain a vapor pressure in the chamber lower than the pressure of the atmosphere, passing the water from the first chamber through a second closed chamber containing a vapor space, withdrawing air and vapor from second chamber to maintain a vapor pressure in the chamber lower than the pressure in the first mentioned chamber, abstracting heat from the air and vapor mixture withdrawn from said second chamber without changing its pressure to thereby reduce the volume of the mixture and condense vapor therefrom, then raising the temperature of the uncondensed residue of said mixture and adding to it the vapor mixture withdrawn from the first chamber, and abstracting heat from the resultant mixture to condense vapor therein.

6. The method of deaerating water which consists in passing the water through a closed chamber containing a vapor space, withdrawing air and vapor from said chamber to maintain a vapor pressure in the chamber lower than that of the atmosphere, passing the water from the first chamber through a second closed chamber containing a vapor space, withdrawing air and vapor from said second chamber to maintain a vapor pressure therein lower than the vapor pressure in the first mentioned chamber, cooling the vapor mixture withdrawn from the second chamber in successive stages and raising its pressure between the successive stages so that its pressure in the final stage is not less than that of the atmosphere, and mixing the air and vapor mixture from the first chamber with the uncondensed residue of the air and vapor mixture from the second chamber after the last mentioned mixture has passed through one or more cooling stages and prior to its passage through the final cooling stage.

7. The method of deaerating water which consists in passing the water through a closed chamber containing a vapor space, withdrawing air and vapor from said chamber, passing the water from the first chamber through a second closed chamber containing a vapor space, withdrawing air and vapor from said second chamber to maintain a vapor pressure therein lower than the vapor pressure in the first mentioned chamber, cooling the vapor mixture withdrawn from the second chamber in successive stages and raising its pressure between the successive stages so that its pressure in the final stage is not less than that of the atmosphere and mixing the air and vapor withdrawn from the first mentioned chamber with the uncondensed residue of said air and vapor mixture after the latter has passed through one or more initial cooling stages and prior to its passage through the final cooling stage.

8. The method of deaerating water which consists in passing heated water through a closed chamber in which a vapor space is maintained and from which air and vapor is withdrawn to maintain a vapor pressure therein lower than the pressure of the atmosphere and lower than the pressure of the water as it passes to said chamber, cooling the air and vapor mixture withdrawn from said chamber in successive stages, and increasing the pressure of the mixture after it has passed through an initial cooling stage and before it has passed through a final cooling stage.

9. The method of deaerating water which consists in passing the water into a closed chamber in which a vapor space is maintained, withdrawing air and vapor from said chamber to maintain a vapor pressure therein lower than the pressure of the water as it passes to said chamber, cooling the air and vapor mixture withdrawn from said chamber in successive stages by transferring heat therefrom to the water passing to the chamber and raising the pressure of said mixture to a pressure not less than that of the atmosphere after the mixture has passed through an initial cooling stage and before it passes through the final cooling stage.

10. The method of deaerating water which consists in passing the water successively through one and then the second of two deaerating chambers, in each of which a vapor space is maintained, withdrawing air and vapor from said one chamber to maintain vapor pressure therein below that of the atmosphere, withdrawing air and vapor from the other chamber to maintain a vapor pressure therein lower than that in the first chamber, cooling the air and vapor withdrawn from the second chamber and then raising the pressure of the uncondensed residue and then further cooling the mixture in admixture with the vapor and air withdrawn from the first mentioned chamber.

11. The method of deaerating water which consists in passing the water successively through one and then through the second of two deaerating chambers, in each of which a vapor space is maintained, withdrawing air and vapor from the first chamber to maintain a vapor pressure therein below that of the atmosphere, withdrawing air and vapor from the other chamber to maintain a vapor pressure therein lower than that in the first chamber, raising the pressure of the air and vapor mixtures withdrawn from said one chamber to the pressure of the atmosphere, raising the pressure withdrawn from the and vapor mixture withdrawn from the second chamber to atmosphereic pressure by a multistage compression and cooling said mixture between successive compression stages.

12. The method of deaerating water which consists in passing the water through a closed chamber containing a vapor space, withdrawing air and vapor from said chamber with a steam jet exhauster to maintain a vapor pressure in the chamber lower than the pressure in the atmosphere, passing the water from the first chamber through a second closed chamber containing a vapor space, withdrawing air and vapor from said second chamber with a steam jet exhauster to maintain a vapor pressure therein lower than the vapor pressure in the first mentioned chamber, and transferring heat from the air and vapor mixtures discharged by said exhausters, to the water to be deaerated as it passes to the first mentioned chamber.

13. Apparatus for deaerating water, comprising in combination a closed deaerating chamber in the upper portion of which a vapor space is maintained and which is provided with an inlet for the water to be deaerated opening into the upper portion of said vapor space, a second closed chamber in which a vapor space is maintained, a connection for passing water from the lower portion of the first mentioned chamber into the upper portion of said second chamber, a surface condenser, a conduit connection from the vapor space of said second chamber to the condensing space of said condenser, a second surface condenser with a vent to the atmosphere from its condensing space, and separate air exhausters discharging into the last mentioned condensing space from the first mentioned chamber and the first mentioned condensing space, respectively, and adapted to maintain a vapor pressure in the first mentioned chamber lower than that of the atmosphere and a vapor pressure in said second chamber lower than the vapor pressure maintained in the first mentioned chamber.

14. Apparatus for deaerating water, comprising in combination a closed deaerating chamber in the upper portion of which a vapor space is maintained and which is provided with an inlet for the water to be deaerated opening into the upper portion of said vapor space, a second closed chamber in which a vapor space is maintained, a connection for passing water from the lower portion of the first mentioned chamber into the upper portion of the second chamber, a surface condenser, a conduit connection from the vapor space of said second chamber to the condensing space of said condenser, a second surface condenser with a vent to the atmosphere from its condensing space, and separate air exhausters discharging into the last mentioned condensing space from the first mentioned chamber and the first mentioned condensing space, respectively, and adapted to maintain a vapor pressure in the first mentioned chamber lower than that of the atmosphere and a vapor pressure in said second chamber lower than the vapor pressure maintained in the first mentioned chamber, and means for passing the water to be deaerated to said inlet through the cooling liquid space of the first mentioned condenser and then through the cooling liquid space of the other condenser.

15. Apparatus for deaerating water, comprising in combination a closed deaerating chamber in the upper portion of which a vapor space is maintained and which is provided with an inlet for the water to be deaerated opening into the upper portion of said vapor space, a second closed chamber in which a vapor space is maintained, a connection for passing water from the lower portion of the first mentioned chamber into the upper portion of said second chamber, a surface condenser, an air cooler of the surface condenser type, means for passing the water to be treated serially through the cooling liquid spaces of said condenser and an air cooler to said inlet, a conduit connection from the vapor space of said second chamber to the condensing space of said condenser, a vent to the atmosphere from the air space of said air cooler, and air exhaust provisions discharging into the air space of said cooler and withdrawing air and vapor from the first mentioned chamber and from the condensing space of said condenser to maintain a vapor pressure in the first mentioned chamber lower than that of the atmosphere, and a vapor pressure in said second chamber lower than the vapor pressure maintained in the first mentioned chamber.

Signed at Philadelphia, in the county of Philadelphia and State of Pennsylvania, this seventeenth day of November A. D. 1922.

GEORGE H. GIBSON.